(12) United States Patent
Ishikawa

(10) Patent No.: US 11,693,425 B2
(45) Date of Patent: Jul. 4, 2023

(54) AUTOMATED GUIDED VEHICLE AND AUTOMATED GUIDED VEHICLE CONTROL SYSTEM

(71) Applicant: FUJI CORPORATION, Chiryu (JP)

(72) Inventor: Kohei Ishikawa, Hekinan (JP)

(73) Assignee: FUJI CORPORATION, Chiryu (JP)

( * ) Notice: Subject to any disclaimer, the term of this patent is extended or adjusted under 35 U.S.C. 154(b) by 290 days.

(21) Appl. No.: 16/770,860

(22) PCT Filed: Dec. 22, 2017

(86) PCT No.: PCT/JP2017/046244
§ 371 (c)(1),
(2) Date: Jun. 8, 2020

(87) PCT Pub. No.: WO2019/123660
PCT Pub. Date: Jun. 27, 2019

(65) Prior Publication Data
US 2020/0393849 A1 Dec. 17, 2020

(51) Int. Cl.
*G05D 1/02* (2020.01)
*G05D 1/00* (2006.01)

(52) U.S. Cl.
CPC ......... *G05D 1/0289* (2013.01); *G05D 1/0022* (2013.01); *G05D 1/0214* (2013.01); *G05D 1/0293* (2013.01)

(58) Field of Classification Search
CPC .. G05D 1/0289; G05D 1/0022; G05D 1/0214; G05D 1/0293; G05D 1/0234; G05D 2201/0216; B60W 30/09; G08G 1/00; G08G 1/16
See application file for complete search history.

(56) References Cited

U.S. PATENT DOCUMENTS

2017/0192438 A1* 7/2017 Morimoto ............. B60W 40/13

FOREIGN PATENT DOCUMENTS

| CN | 107608323 A | * | 1/2018 | ........... G05B 19/418 |
| EP | 3 218 775 | | 9/2017 | |
| JP | H05113988 A | * | 5/1993 | ............. B65G 61/00 |
| JP | 6-83444 A | | 3/1994 | |

(Continued)

OTHER PUBLICATIONS

English Translation of CN107608323A.*
(Continued)

*Primary Examiner* — Rami Khatib
*Assistant Examiner* — Shahira Baajour
(74) *Attorney, Agent, or Firm* — Oblon, McClelland, Maier & Neustadt, L.L.P.

(57) ABSTRACT

Provided is an automated guided vehicle that travels on a traveling path by loading at least one of a member required for a production work in which production equipment produces a product and a production tool detachable to the production equipment, and shares at least a portion of the traveling path with another automated guided vehicle, in which a traveling priority is variably set based on a work priority determined from a status of the production work, and when the traveling priority of the automated guided vehicle is higher than the traveling priority of the another automated guided vehicle, the automated guided vehicle is prioritized for traveling on the traveling path.

9 Claims, 8 Drawing Sheets

(56) References Cited

FOREIGN PATENT DOCUMENTS

| JP | 8-208183 A | 8/1996 | | |
|---|---|---|---|---|
| JP | 11-143533 A | 5/1999 | | |
| JP | 2003-44139 A | 2/2003 | | |
| JP | 2004-334724 A | 11/2004 | | |
| JP | 2005216971 A | * | 8/2005 | |
| JP | 2010-79407 A | 4/2010 | | |
| JP | 2017-117328 A | 6/2017 | | |
| JP | 2017-122990 A | 7/2017 | | |
| WO | WO-0223296 A1 | * | 3/2002 | ........... G05D 1/0295 |
| WO | WO 2016/135378 A1 | 9/2016 | | |
| WO | WO 2016/076980 A1 | 5/2019 | | |

OTHER PUBLICATIONS

English Translation of JP2005216971A.*
English Translation of JPH05113988A.*
English Translation of CN-107608323-A (Year: 2018).*
English Translation of JP-2005216971-A (Year: 2005).*
English translation of JPH015113988A (Year: 1993).*
International Search Report dated Feb. 20, 2018 in PCT/JP2017/046244 filed Dec. 22, 2017, citing documents AO-AU therein, 2 pages.

* cited by examiner

Fig. 3

| FACTOR | EXAMPLIFIED STATUS OF PRODUCTION WORK | WORK PRIORITY |
|---|---|---|
| 1. TIME TO REQUIRE MEMBER OR PRODUCTION TOOL | PRODUCTION WORK IS INTERRUPTED DUE TO MISSING-PART (IMMEDIATELY REQUIRED) | HIGH |
| | MISSING-PART NOTICE IS GENERATED DURING LOT PRODUCTION (REQUIRED IN NEAR FUTURE) | MEDIUM |
| | SETUP WORK NECESSARY FOR NEXT LOT PRODUCTION (REQUIRED IN FUTURE) | LOW |
| 2. PRODUCTION ORDER OF PRODUCTS | DUE TIME FOR PRODUCTION COMPLETION COMES EARLY | HIGH |
| | DUE TIME FOR PRODUCTION COMPLETION COMES LATE | LOW |
| 3. TRAVELING PURPOSE OF AUTOMATED GUIDED VEHICLE | CONVEYANCE OF PARTS AND PRODUCTION TOOL USED FOR PRODUCTION WORK | HIGH |
| | RETURN OF USED PRODUCTION TOOL | MEDIUM |
| | TRAVELING TO STANDBY POSITION | LOW |

AUTOMATED GUIDED VEHICLE AND AUTOMATED GUIDED VEHICLE CONTROL SYSTEM

TECHNICAL FIELD

The present specification relates to an automated guided vehicle and an automated guided vehicle control system, and more particularly, to a technique for avoiding interference of multiple automated guided vehicles in a traveling path.

BACKGROUND ART

Recently, in response to the demands of automation and labor-saving of logistics and production, automated guided vehicles have become widespread. The automated guided vehicle travels along a traveling path set up in an automatic warehouse or a production factory, and conveys loaded materials or equipment. In many cases, multiple automated guided vehicles are applied and at least a part of the traveling path is commonly used. The traveling plans of the multiple automated guided vehicles are often planned and managed by a higher-level traveling management section. Thus, interference of the multiple automated guided vehicles in the traveling path can be avoided. Examples of interference avoidance techniques for this type of automated guided vehicle are disclosed in Patent Literatures 1 to 4.

In the automated guided vehicle system of Patent Literature 1, each automated guided vehicle includes transmission and reception means for communicating with another automated guided vehicle. Each automated guided vehicle, when it reaches an upstream position of a junction portion of the track, performs transmission if it is traveling on a first track, prioritizes reception waiting than the transmission if it is traveling on a second track, and stops or continues traveling based on the result of the transmission and reception. According to this, even when the automated guided vehicle enters the junction portion at any timing, traveling priority can be made under control by appropriately performing communication.

Patent Literature 2 discloses a deadlock elimination method in an automated guided system using an automatic traveling moving object. In this deadlock elimination method, when moving objects compete with each other on a traveling path, the moving object having a low traveling priority re-selects a traveling path. Further, when at least three moving objects block each other in the advancing direction and fall into a deadlock, predetermined two moving objects are set as a competing state, and the deadlock is sequentially eliminated. Therefore, it is said that it is unnecessary to examine conditions for preventing deadlock in advance, which makes it possible to improve the efficiency of the design and operation of the automated guided system.

Further, Patent Literature 3 discloses an operation control device for controlling an operation of multiple conveyance carriages traveling in the track. This operation control device includes means for monitoring a priority set on the conveyance carriage or a priority of the conveyance object, means for determining a priority carriage among the conveyance carriages present near the junction portion of the track, and means for generating an operation command for preferentially traveling the priority carriage and transmitting the operation command to each conveyance carriage. Therefore, it is said that the preferential traveling of the priority carriage enables efficient conveyance of high priority conveyance object.

Further, Patent Literature 4 discloses a traveling control method of an automated guided vehicle traveling along a traveling path divided into multiple zones with an intersection. In this traveling control method, the entering priority of an automated guided vehicle into an intersection is determined by the number of automated guided vehicles in the zone cross the intersection. In other words, the entering priority of the automated guided vehicle that is vacant ahead in the advancing direction is increased, and the entering priority of the automated guided vehicle that is crowded in the advancing direction is reduced. According to this, along with the traffic congestion of the automated guided vehicle is alleviated, it is possible to avoid the concentration of the automated guided vehicle to a particular zone.

PATENT LITERATURE

Patent Literature 1: JP-A-2003-44139
Patent Literature 2: JP-A-6-83444
Patent Literature 3: JP-A-2004-334724
Patent Literature 4: JP-A-2010-79407

BRIEF SUMMARY

Technical Problem

Patent Literature 1 is a technique in which transmission and reception methods are determined according to the track of multiple automated guided vehicles while traveling, so that communication can be reliably performed. Therefore, the method of determining the traveling priorities of the multiple automated guided vehicles is not specified. Further, in the technique of Patent Literature 2, it is not necessary to determine the traveling priorities of multiple moving objects. To the contrary, in the technique of Patent Literature 3, the level of traveling priority is set to multiple conveyance carriages, and the traveling control based on the traveling priority is performed. The traveling priority is set, for example, for each individual conveyance carriage.

Here, the technique of Patent Literature 3 becomes insufficient in an automated guided vehicle that conveys a member or a production tool to production equipment. In more details, regarding the member or the production tool to be used immediately in the production work for the production equipment, they are required to be conveyed with top priority. However, in the configuration in which the traveling priority is set individually for an automated guided vehicle, when an automated guided vehicle is prioritized with a high traveling priority and is conveying other conveyance objects, it is impossible to convey the object to be conveyed with top priority. Further, even when the similar type of conveyance object are conveyed, the traveling priority needs to be variably set in accordance with the level of work priority in the production equipment. For instances, it is preferable to change the traveling priorities depending on whether the conveyance object is immediately used in the production work, or is conveyed in advance for future use.

In the technique of Patent Literature 3, if the types of conveyance objects are the same, the traveling priority becomes constant, and the level of the work priority in the production equipment is not considered. Similarly, in the techniques of Patent Literatures 1, 2, and 4, the level of the work priority in the production equipment is not considered. Therefore, in the prior art of Patent Literatures 1 to 4, there is a concern that the operating ratio may be lowered due to a delay in the production work of the production equipment. Considering the status of the production work in the production equipment, the technique to set the traveling priority of the automated guided vehicle is necessary.

The problem to be solved by the present specification is to provide an automated guided vehicle and automated guided vehicle control system that can maintain a high operating ratio of production equipment while preventing interference of multiple automated guided vehicles by setting a traveling priority in consideration of the status of the production work in the production equipment.

Solution to Problem

The present specification discloses an automated guided vehicle that travels on a traveling path by loading at least one of a member required for a production work in which production equipment produces a product and a production tool detachable to the production equipment, and shares at least a portion of the traveling path with another automated guided vehicle, in which a traveling priority is variably set based on a work priority determined from a status of the production work, and when the traveling priority of the automated guided vehicle is higher than the traveling priority of the another automated guided vehicle, the automated guided vehicle is prioritized for traveling on the traveling path.

Further, the present specification discloses an automated guided vehicle control system which uses multiple automated guided vehicles that travel on a traveling path by loading at least one of a member required for a production work in which production equipment produces a product and a production tool detachable to the production equipment as control targets, and prevents the multiple automated guided vehicles from interfering with each other on the traveling path, the system including: a setting section configured to set a traveling priority of each of the multiple automated guided vehicles based on a work priority determined from a status of the production work; and when the multiple automated guided vehicles are scheduled to enter a part of the traveling path together, an interference avoidance section configured to control an availability for an entry of each of the automated guided vehicles into the part of the traveling path based on the traveling priority set for each of the automated guided vehicles.

Advantageous Effects

In an automated guided vehicle disclosed in the present specification, a traveling priority is variably set based on the work priority determined from a status of the production work, and when the own traveling priority is higher than the traveling priority of another automated guided vehicle, the automated guided vehicle is prioritized for traveling on the traveling path. According to this, since the automated guided vehicle loaded with a member or a production tool corresponding to the high work priority, travels with priority on the traveling path, it does not interfere with the another automated guided vehicle. Further, the production work corresponding to the high work priority is not delayed because the member or the production tool is conveyed in a timely manner. Furthermore, even when the production work is interrupted, the interruption time is limited. Therefore, the operating ratio of the production equipment can be maintained high.

Similarly, in the automated guided vehicle control system disclosed in the present specification, the operating ratio of the production equipment can be maintained high while preventing interference of multiple automated guided vehicles.

BRIEF DESCRIPTION OF DRAWINGS

FIG. 3 is a diagram illustrating three factors determining a work priority.

DESCRIPTION OF EMBODIMENTS

Figure 1:
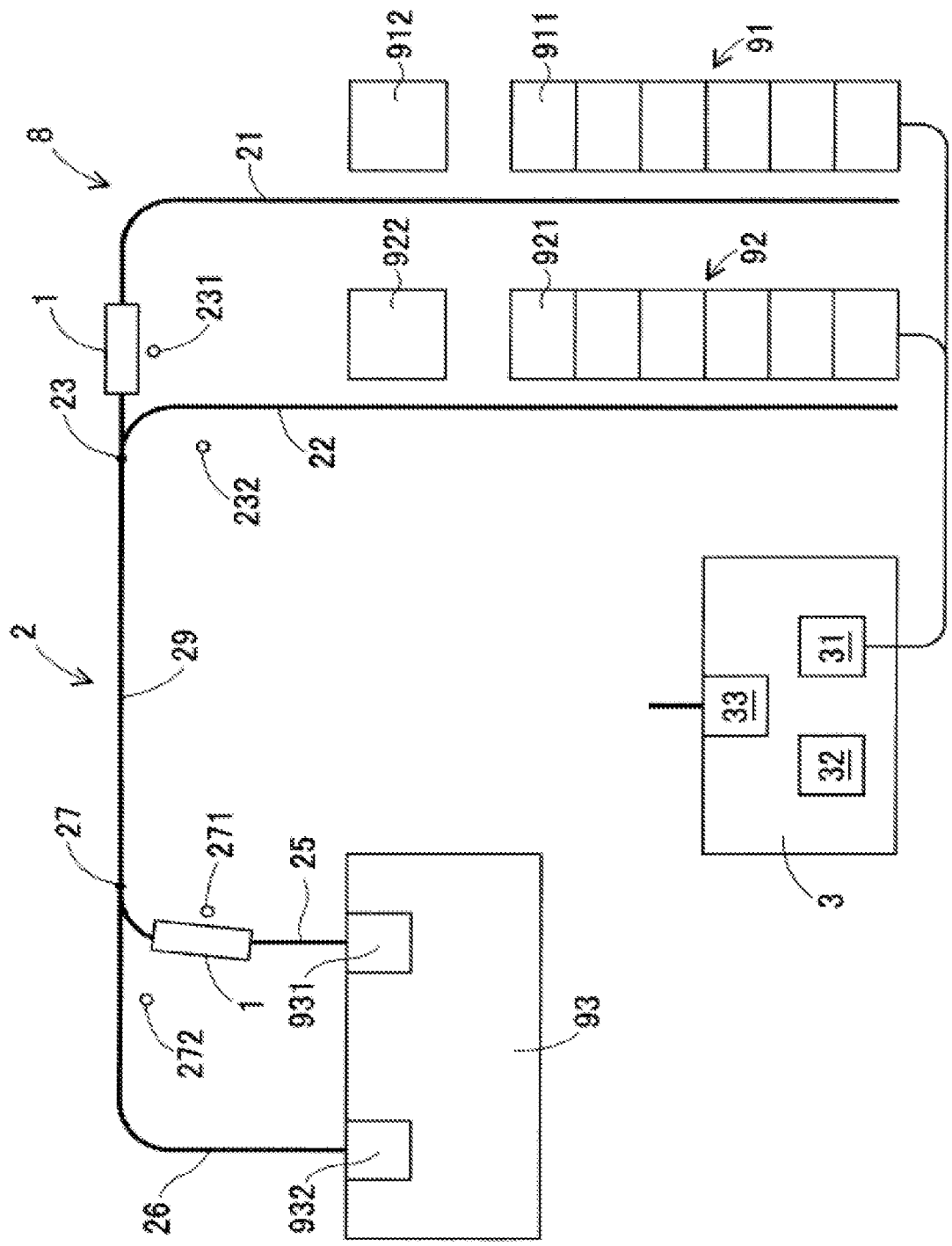
FIG. 1 is a plan view schematically showing an overall configuration and the peripheral configuration of an automated guided vehicle control system of a first embodiment.

1. Configuration of the Periphery to which Automated Guided Vehicle Control System of a First Embodiment is Applied Automated guided vehicle 1 and automated guided vehicle control system 8 of the first embodiment will be described with reference to FIGS. 1 to 5. FIG. 1 is a plan view schematically showing an overall configuration and a peripheral configuration of automated guided vehicle control system 8 of the first embodiment. Automated guided vehicle control system 8 includes multiple automated guided vehicles 1, traveling path 2, and production management device 3. Automated guided vehicle control system 8 causes multiple automated guided vehicles 1 to travel along traveling path 2 as a control target. Automated guided vehicle 1 conveys a member and a production tool between first production equipment 91 and second production equipment 92, and automatic warehouse 93.

First, the configuration of the periphery where automated guided vehicle control system 8 is applied will be described. First production equipment 91 is a first board work line configured by arranging multiple types of board work machines 911 for sharing and performing a board production work. First set-up station 912 is provided near first production equipment 91. The member required for the production work of first production equipment 91 and the production tool that is detachable to the first production equipment are conveyed in and conveyed out of first set-up station 912. Further, in first set-up station 912, an operator performs a setup work or a cleaning work.

Similarly, second production equipment 92 is a second board work line configured by arranging multiple types of board work machines 921 for sharing and performing the board production work. Second set-up station 922 is provided near second production equipment 92. The member required for the production work of second production equipment 92 and the production tool that is detachable to the second production equipment are conveyed in and conveyed out of second set-up station 922. Further, in second set-up station 922, an operator performs a setup work or a cleaning work.

As board work machine 911, 921, a component mounter or a solder printer can be exemplified. Further, as the member described above, various components required for the component mounter or cream solder required for the solder printer can be exemplified. As the production tool, a tape feeder, a mounting head, and a suction nozzle which are detachable to the component mounter, as well as a printing screen and a squeegee which are detachable to the solder printer can be exemplified.

As the setup work described above, a work to set a reel on which a carrier tape for component supply is wound on the tape feeder or a work to optimize the temperature of the cream solder can be exemplified. The member and production tool in which the setup work is ended is conveyed to first production equipment 91 and second production equipment 92 by automated guided vehicle 1. The work of supplying the member to first production equipment 91 and second production equipment 92, and the work of attaching the production tool may be performed automatically or may be performed by an operator.

Further, the production tool used in first production equipment 91 and second production equipment 92 is conveyed to first set-up station 912 or second set-up station 922 by automated guided vehicle 1. As the cleaning work described above, a work of removing the reel from the used tape feeder or a work of cleaning the used printing screen and squeegee can be exemplified. The production tool in which the cleaning work is ended is returned to automatic warehouse 93 by the automated guided vehicle 1.

Automatic warehouse 93 stores and provides the member and production tool used in first production equipment 91 and second production equipment 92 as required. Automatic warehouse 93 has first loading port 931 and second loading port 932 for loading the member and the production tool into automated guided vehicle 1. The loading work may be performed automatically or may be performed by an operator. Automatic warehouse 93 may receive the returned production tool at first loading port 931 or second loading port 932.

Figure 2:
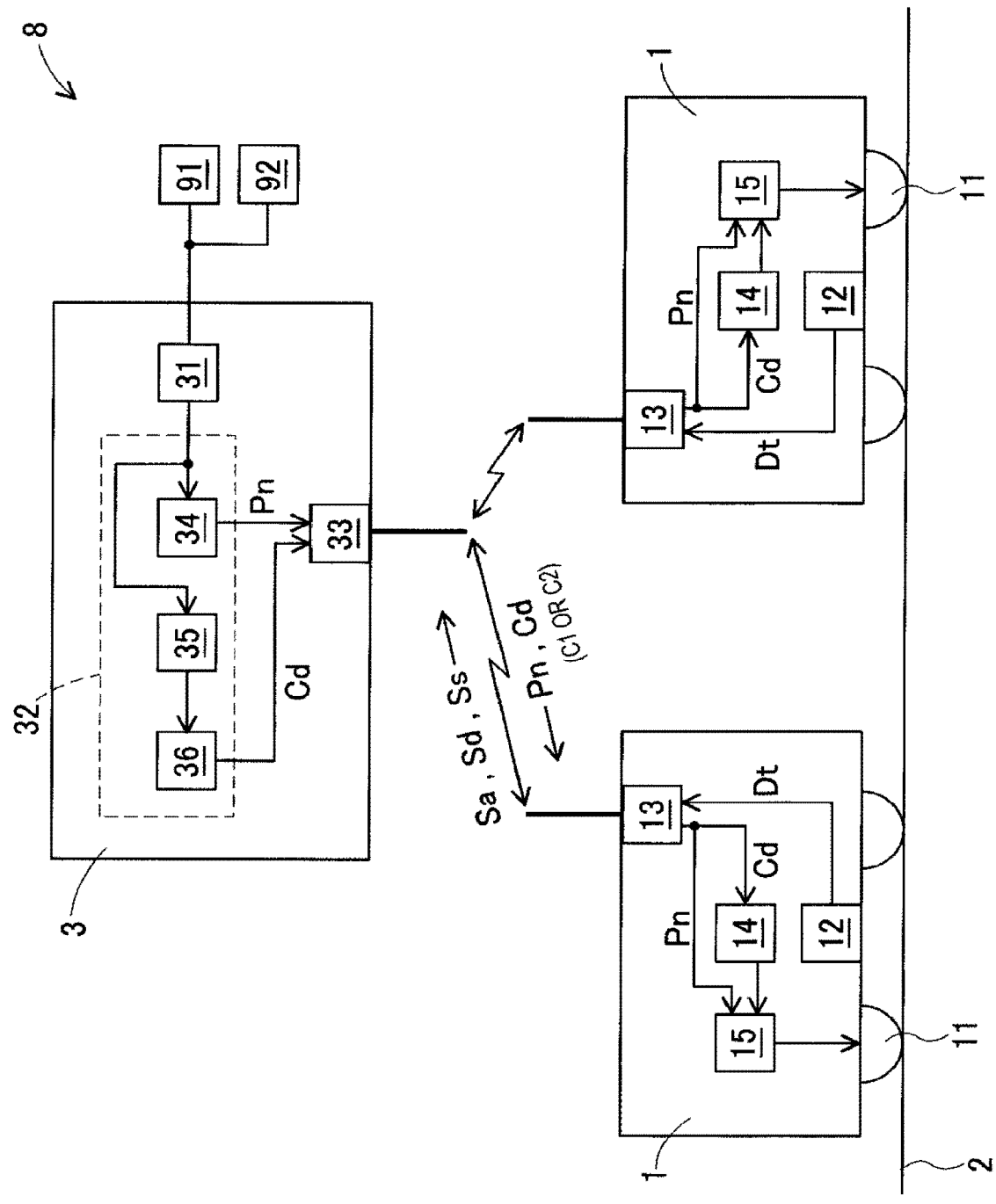
FIG. 2 is a block diagram showing a functional configuration of the automated guided vehicle control system of the first embodiment.

2. Configuration of Automated Guided Vehicle 1 and Automated Guided Vehicle Control System 8 of the First Embodiment Moving on to the description of automated guided vehicle 1 and automated guided vehicle control system 8. FIG. 2 is a block diagram showing a functional configuration of automated guided vehicle control system 8 of the first embodiment. Production management device 3 is configured by using a computer device, Production management device 3 includes production management section 31, traveling management section 32, and communication section 33, Production management section 31 is wired-connected to first production equipment 91 and second production equipment 92. Production management section 31 issues a command to first production equipment 91 and second production equipment 92, also ascertains the status of the production work of first production equipment 91 and second production equipment 92. Details of traveling management section 32 and communication section 33 will be described later.

Traveling path 2 in which multiple automated guided vehicles 1 travel is divided into five. That is, traveling path 2 constituted by equipment-side first traveling path 21, equipment-side second traveling path 22, warehouse-side first traveling path 25, warehouse-side second traveling path 26, and communicating traveling path 29. Equipment-side first traveling path 21 is provided along first production equipment 91 and extends to equipment-side junction point 23 through first set-up station 912. Equipment-side second traveling path 22 is provided along second production equipment 92 and extends to equipment-side junction point 23 through second set-up station 922.

In equipment-side first traveling path 21 and equipment-side second traveling path 22, by setting different target destinations, multiple automated guided vehicles 1 can enter, A location marker (not shown) indicating a target destination is provided in each of board work machines 911 of first production equipment 91, each of board work machines 921 of second production equipment 92, first set-up station 912, and second set-up station 922.

Warehouse-side first traveling path 25 extends from first loading port 931 of automatic warehouse 93 to warehouse-side junction point 27. Warehouse-side second traveling path 26 extends from second loading port 932 to warehouse-side junction point 27, In warehouse-side first traveling path 25 and warehouse-side second traveling path 26, one automated guided vehicle 1 can enter. When there are two automated guided vehicles 1, it is sufficient to have two traveling paths (25, 26) and two loading ports (931, 932). First loading port 931 and second loading port 932 are also provided with location markers (not shown). Note that a standby position for waiting when there is no conveyance object at the moment may be added to the target destination.

Communicating traveling path 29 allows equipment-side junction point 23 and warehouse-side junction point 27 to communicate with each other. Entire traveling path 2 is common to multiple automated guided vehicles 1. All automated guided vehicles 1 travel in communicating traveling path 29 to and move between first production equipment 91 and second production equipment 92, and automatic warehouse 93, Therefore, it is necessary to avoid interference of multiple automated guided vehicles 1 in communicating traveling path 29.

In, two automated guided vehicles 1 are scheduled to enter communicating traveling path 29 from the reverse direction, and there is a risk of interference. There is also a risk of interference when two automated guided vehicles 1 enter communicating traveling path 29 from the same direction. For example, there is a risk of interference when one automated guided vehicle 1 is directed from warehouse-side first traveling path 25 to communicating traveling path 29, and another automated guided vehicle 1 is directed from warehouse-side second traveling path 26 to communicating traveling path 29.

In the vicinity of equipment-side junction point 23 of equipment-side first traveling path 21, equipment-side first marker 231 is provided. In the vicinity of equipment-side junction point 23 of equipment-side second traveling path 22, equipment-side second marker 232 is provided. Similarly, in the vicinity of warehouse-side junction point 27 of warehouse-side first traveling path 25, warehouse-side first marker 271 is provided. In the vicinity of warehouse-side junction point 27 of warehouse-side second traveling path 26, warehouse-side second marker 272 is provided.

As shown in, traveling management section 32 of production management device 3 includes planning section 34, setting section 35, and command section 36. Planning section 34 acquires a progress status of the production work of first production equipment 91 and second production equipment 92, which is ascertained by production management section 31. In addition, planning section 34 sets traveling plan Pn of multiple automated guided vehicles 1 according to the progress status of the production work. This traveling plan Pn includes information about a type of conveyance object to be loaded, traveling start location, target destination, and traveling route. Planning section 34 sends planned traveling plan Pn to communication section 33. Communication section 33 transmits traveling plan Pn to each automated guided vehicle 1.

Setting section 35 acquires a work priority determined for each automated guided vehicle 1 from the status of first production equipment 91 and second production equipment 92 which is ascertained by production management section 31. The work priority is variable for each automated guided vehicle 1, Further, setting section 35 sets the traveling priority for each of multiple automated guided vehicles 1 based on the work priority. FIG. 3 is a diagram illustrating three factors determining a work priority, Only one of the three factors may be used, or multiple factors may be used in combination.

A first factor that determines the work priority is a time to require the member or the production tool. For example, when the production work is interrupted due to a missing-part in first production equipment 91, it is necessary to immediately eliminate the missing-part. Therefore, the work priority of the automated guided vehicle 1 that travels by loading the missing-part member or production tool is determined to be "high". Similarly, the work priority of automated guided vehicle 1 heading to automatic warehouse 93 for loading the missing-part member or production tool is also determined to be "high".

Further, in first production equipment 91, when a missing-part notice is generated during a lot production of a board, the corresponding member or production tool is required in the near future. Accordingly, the work priority of the automated guided vehicle 1 is determined to be "medium" in such a case of traveling with loading the member or the production tool, to which a missing-part notice has been generated. Further, in first production equipment 91, a member or a production tool used for a setup work of a board to be produced next in a lot is required in the future. Therefore, the work priority of the automated guided vehicle 1 that travels by loading the member or the production tool used in the setup work is determined to be "low"

The second factor that determines the work priority is a production order of the products. For example, it is assumed that a case where due time for a production completion of a first board produced by first production equipment 91 comes early, while due time for the production completion of a second board produced by the second production equipment comes late. In this case, it is necessary to give priority to the production work of first production equipment 91. Therefore, the work priority of the automated guided vehicle 1 for performing a conveyance to first production equipment 91 is determined to be "high". On the other hand, the work priority of the automated guided vehicle 1 for performing a conveyance to second production equipment 92 is determined to be "low".

The third factor for determining the work priority is a traveling purpose of automated guided vehicle 1. For example, when the conveyance of the member and the production tool used for the production work of first production equipment 91 is delayed, a hindrance occurs in the production work, and thus the degree of importance is high. Therefore, the work priority of the automated guided vehicle 1 in which the traveling purpose is to convey the member and the production tool used for the production work is determined to be "high". On the other hand, the used production tool is not hindered even when the conveyance for return is delayed a little, and thus the degree of importance is substantially medium. Therefore, the work priority of the automated guided vehicle 1 in which the traveling purpose is to return the used production tool is determined to be "medium". In addition, the degree of importance of the traveling purpose, which returns to the preset standby position after the end of conveyance, is low. Therefore, the work priority of automated guided vehicle 1 that returns to the standby position is determined to be "low".

Setting section 35 sets the traveling priorities of multiple automated guided vehicles 1 in descending order of the work priority. Setting section 35 sets the same traveling priority when the work priorities of multiple automated guided vehicles 1 are equal, Note that one of the three factors may be used as a main factor, and another factor may be used as a sub-factor. In this case, setting section 35 sets the traveling priority with reference to the sub-factor only when the work priorities of the main factors of multiple automated guided vehicles 1 are equal.

When multiple automated guided vehicles 1 are scheduled to enter communicating traveling path 29 together, command section 36 determines an availability for an entry based on the set traveling priority. In other words, when multiple automated guided vehicles 1 are likely to interfere with communicating traveling path 29, command section 36 determines to avoid the interference. Specifically, command section 36 assigns travel command C1, which means available-to-enter, to automated guided vehicle 1 with the highest traveling priority. Further, the command section 36 assigns stop command C2, which means unavailable-to-enter, to another automated guided vehicles 1.

Note that when the traveling priorities of multiple automated guided vehicles 1 are equal, command section 36 determines one automated guided vehicle 1 to which travel command C1 is assigned based on a predetermined rule. For example, command section 36 assigns travel command C1 to automated guided vehicle 1 that has approached marker (231, 232, 271, 272) earliest among the multiple automated guided vehicles 1 having the equal traveling priority. Command section 36 sends command Cd (travel command C1 or stop command C2) with respect to each automated guided vehicle 1 to communication section 33. Communication section 33 transmits command Cd to each automated guided vehicle 1.

Further, as shown in, the automated guided vehicle 1 has driving section 11, marker detecting section 12, communication section 13, interference avoidance section 14, and drive control section 15. Driving section 11 drives the traveling of automated guided vehicle 1. As driving section 11, a rotation motor or a linear motor can be utilized, and it is not limited thereto. Marker detecting section 12 detects that automated guided vehicle 1 is close to marker (231, 232, 271, 272), and sends the detection signal Dt to communication section 13. Further, marker detecting section 12 detects a location marker. Automated guided vehicle 1 stops when the detected location marker indicates the target destination while traveling, and continues traveling when the detected location marker does not indicate the target destination.

Communication section 13 performs an information exchange by communicating with communication section 33 of production management device 3. Communication section 13 and communication section 33 have a bidirectional wireless communication function. However, the communication method is not limited to this, and any communication method can be adopted. Communication section 13 receives traveling plan Pn and command Cd from communication section 33. Communication section 13 transmits approach signal Sa, direction signal Sd, and stop signal Ss, which represent the status of automated guided vehicle 1, to communication section 33.

Approach signal Sa is transmitted when communication section 13 receives detection signal Dt. Direction signal Sd is transmitted in association with approach signal Sa. Direction signal Sd means a traveling direction of automated guided vehicle 1. That is, direction signal Sd means one of an entering direction for entering communicating traveling path 29 and an exiting direction for coming out (exiting) of communicating traveling path 29. Stop signal Ss represents that automated guided vehicle 1 has reached and stopped at a predetermined target destination and does not immediately restart traveling.

Interference avoidance section 14 controls whether to execute the entry to communicating traveling path 29 in accordance with command Cd from command section 36. Drive control section 15 controls driving section 11 according to traveling plan Pn at normal times. Further, during the operation of interference avoidance section 14, drive control section 15 controls driving section 11 according to the control of interference avoidance section 14.

Figure 4:
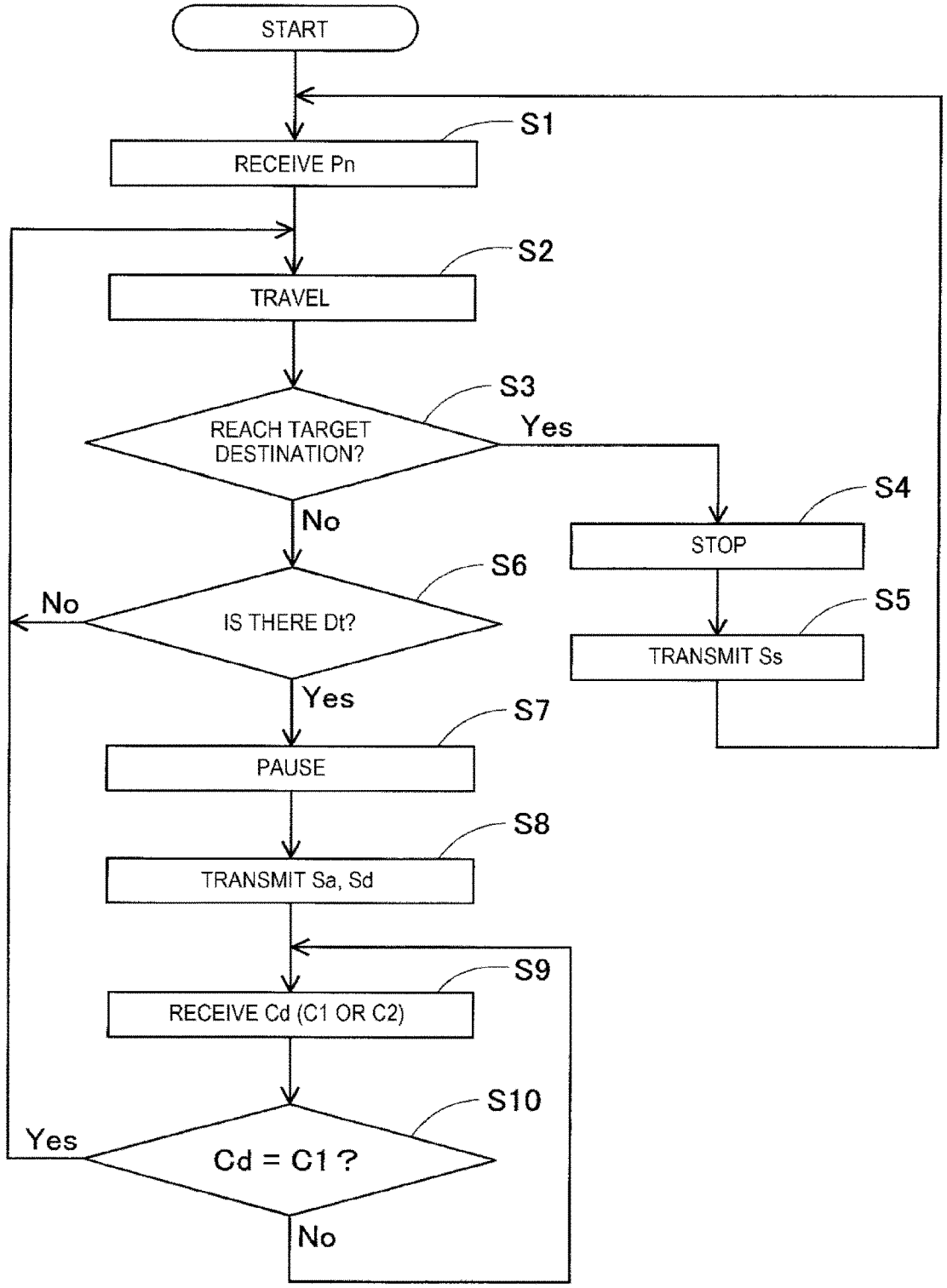
FIG. 4 is an operation flowchart illustrating an operation of an automated guided vehicle.
Figure 5:
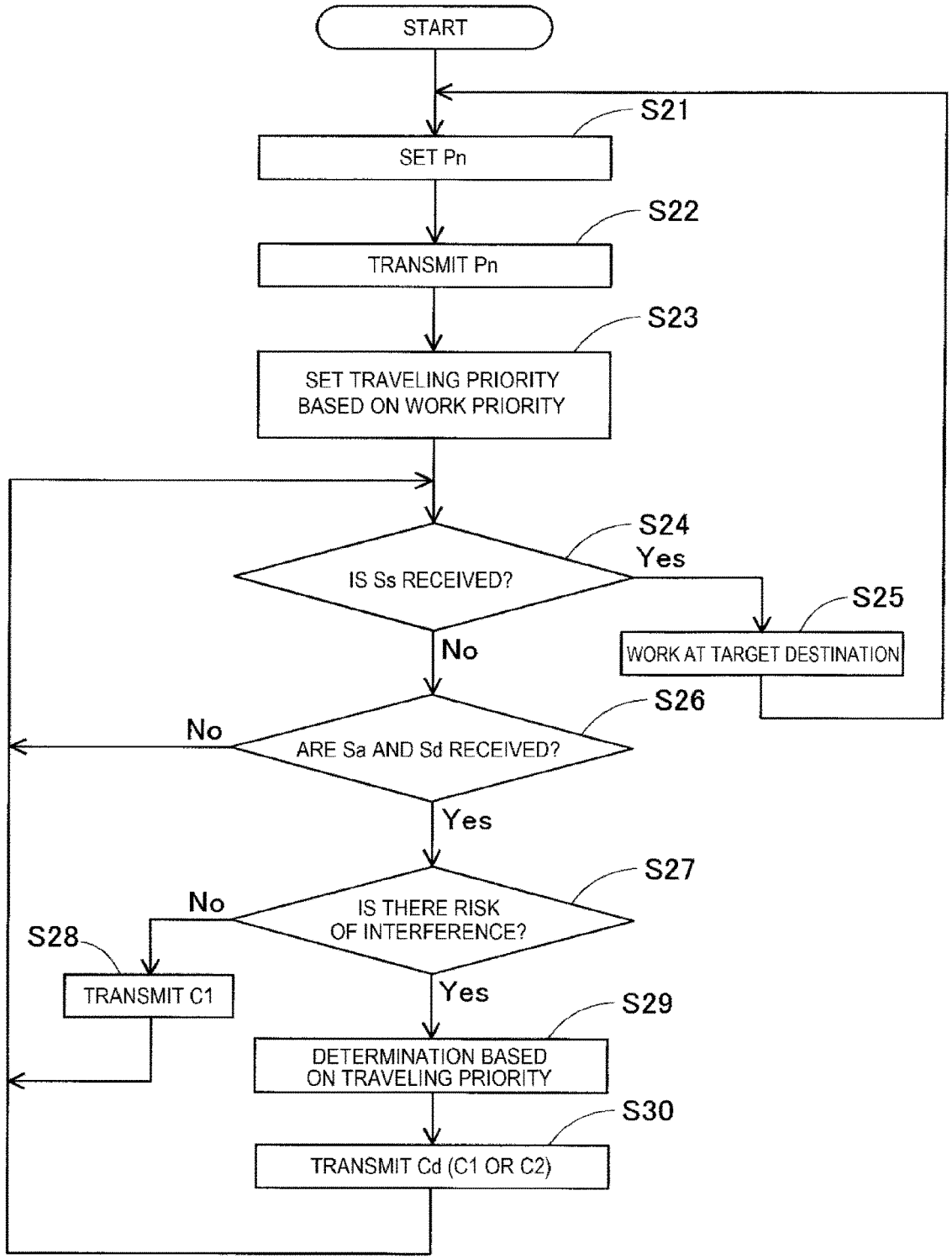
FIG. 5 is an operation flowchart illustrating an operation of a traveling management section of a production management device.

3. Operation of Automated Guided Vehicle 1 and Automated Guided Vehicle Control System 8 of the First Embodiment Next, the operation of automated guided vehicle 1 and automated guided vehicle control system 8 of the first embodiment will be described. FIG. 4 is an operation flowchart illustrating an operation of automated guided vehicle 1. Further, FIG. 5 is an operation flowchart illustrating an operation of traveling management section 32 of production management device 3, Traveling management section 32 uses the operation flow shown in for multiple automated guided vehicles 1 in parallel.

In step S1 in, communication section 13 of automated guided vehicle 1 receives traveling plan Pn. In the next step S2, automated guided vehicle 1 travels along traveling path 2 in accordance with traveling plan Pn. In the next step S3, automated guided vehicle 1 determines whether it has reached the target destination set in traveling plan Pn. In step S4 when automated guided vehicle 1 has reached the target destination, automated guided vehicle 1 stops at the target destination and becomes a state in which work such as loading and unloading of the member or the production tool is possible. In the next step S5, communication section 13 transmits stop signal Ss. Thereby, the execution of traveling plan Pn is ended. Thereafter, the execution of the operation flow is returned to step S1, and next traveling plan Pn is started.

When automated guided vehicle 1 has not reached the target destination in step S3, the execution of the operation flow proceeds to step S6. In step S6, the presence or absence of detection signal Dt of marker detecting section 12 is determined. When there is no detection signal Dt, the execution of the operation flow is returned to step S2, and automated guided vehicle 1 continues to travel.

In step S7 when detection signal Dt is present, automated guided vehicle 1 is paused. The stop location of automated guided vehicle 1 is in the vicinity of one of markers (231, 232, 271, 272). In the next step S8, communication section 13 transmits approach signal Sa and direction signal Sd. This transmission corresponds to inquiring of traveling management section 32 about the availability for traveling continuation.

In the next step S9, communication section 13 receives command Cd. In the next step S10, interference avoidance section 14 of automated guided vehicle 1 determines whether command Cd is travel command C1 or stop command C2. When command Cd is travel command C1 the execution of the operation flow is returned to step S2, and automated guided vehicle 1 continues to travel. Travel command C1 means that the traveling priority is highest and automated guided vehicle 1 is prioritized for traveling on communicating traveling path 29. Therefore, automated guided vehicle 1 can enter communicating traveling path 29. Note that travel command C1 may also mean that the traveling in the exiting direction coming out of communicating traveling path 29 may be continued.

When command Cd is stop command C2, the execution of the operation flow returns to step S9. In step S9, automated guided vehicle 1 continues to be in a state of pause, Communication section 13 receives next command Cd. Stop command C2 means that another automated guided vehicle 1 having a high traveling priority is traveling on communicating traveling path 29 or is scheduled to enter communicating traveling path 29. Accordingly, the corresponding automated guided vehicle 1 repeats the operation loop which is configured with steps S9 and S10 while receiving stop command C2.

When another automated guided vehicle 1 exits communicating traveling path 29, stop command C2 to automated guided vehicle 1 is changed to travel command C1 Thereafter, the corresponding automated guided vehicle 1 leaves the operation loop. Thereby, the corresponding automated guided vehicle 1 can enter communicating traveling path 29 in step S2. In this way, interference avoidance section 14 controls whether to execute the entry to communicating traveling path 29 based on command Cd, and thus the interference of multiple automated guided vehicles 1 does not occur.

On the other hand, in step S21 in, planning section 34 of traveling management section 32 sets traveling plan Pn based on the progress status of the production work acquired from production management section 31. In the next step S22, communication section 33 transmits traveling plan Pn. In the next step S23, setting section 35 acquires the work priority determined for automated guided vehicle 1 from the status of the production work. Further, setting section 35 sets the traveling priority for each of multiple automated guided vehicles 1 based on the work priority.

In the next step S24, communication section 33 determines whether stop signal Ss is received. When stop signal Ss is received, traveling management section 32 recognizes that automated guided vehicle 1 has reached the target destination, and branches the execution of the operation flow to step S25. In step S25, traveling management section 32 waits for the end of the work at the target destination, for example, the loading and unloading work. When the work is ended, the execution of the operation flow returns to step S21, and planning section 34 sets next traveling plan Pn.

When stop signal Ss is not received in step S24, the execution of the operation flow proceeds to step S26. In step S26, communication section 33 determines whether approach signal Sa and direction signal Sd are received. When the signals are not received, the execute of the operation flow returns to step S24. When the signals are received in step S27, command section 36 determines whether there is a risk of interference between the corresponding automated guided vehicle 1 and another automated guided vehicle 1 in communicating traveling path 29.

More specifically, when direction signal Sd of the corresponding automated guided vehicle 1 does not indicate the entering direction, that is, when the direction signal Sd indicates the exiting direction, the command section 36 determines that there is no risk of interference. That is, the corresponding automated guided vehicle 1 does not enter communicating traveling path 29, and therefore does not interfere with another automated guided vehicle 1. Further, command section 36 determines that there is no risk of interference when another unmanned vehicle 1 other than the corresponding automated guided vehicle 1 is transmitting stop signal Ss. That is, since there is no other automated guided vehicle 1 in travel, even when the corresponding automated guided vehicle 1 enters communicating traveling path 29, interference does not occur. Furthermore, command section 36 determines that there is no risk of interference when another automated guided vehicle 1 is traveling in the exiting direction. Note that the traveling of another automated guided vehicle 1 in the exiting direction is distinguishable from direction signal Sd received in close proximity.

On the other hand, when another automated guided vehicle 1 is traveling in the entering direction, command section 36 determines that there is a risk of interference. This is because it is predicted that another automated guided vehicle 1 passes through the vicinity of one of markers (231, 232, 271, 272) and enters communicating traveling path 29 within a short time. Note that the traveling of another automated guided vehicle 1 in the entering direction is distinguishable based on the fact that stop signal Ss is eliminated recently. Command section 36 branches the execution of the operation flow to step S28 when there is no risk of interference, and proceeds the execution of the operation flow to step S29 when there is a risk of interference.

In step S28 when there is no risk of interference, communication section 33 transmits travel command C1 to the corresponding automated guided vehicle 1. Thereafter, the execution of the operation flow returns to step S24. In step S29 when there is a risk of interference, command section 36 performs a determination for multiple automated guided vehicles 1 based on the traveling priority. That is, command section 36 assigns travel command C1 to specified automated guided vehicle 1 having the highest traveling priority. Further, command section 36 assigns stop command C2 to another automated guided vehicle 1 other than specified unmanned vehicle 1. Note that when the traveling priorities of multiple automated guided vehicles 1 are equal, command section 36 assigns travel command C1 and stop command C2 based on the aforementioned rule.

In the next step S30, communication section 33 transmits command Cd to automated guided vehicle 1. If the corresponding automated guided vehicle 1 is specified automated guided vehicle 1, command Cd becomes travel command C1. If the corresponding automated guided vehicle 1 is other than specified automated guided vehicle 1, command Cd becomes stop command C2. Thereafter, the execution of the operation flow returns to step S24. In the first embodiment, the interference of multiple automated guided vehicles 1 is avoided by command Cd from traveling management section 32.

For automated guided vehicle 1 of the first embodiment, the traveling priority is variably set based on the work priority determined from the status of the production work, and when the traveling priority of automated guided vehicle 1 itself is higher than the traveling priority of another automated guided vehicle 1, automated guided vehicle 1 is prioritized for traveling on traveling path 2. According to this, since automated guided vehicle 1 loaded with a member or a production tool corresponding to the high work priority, travels with priority on traveling path 1, it does not interfere with another automated guided vehicle 1. Further, the production work corresponding to the high work priority is not delayed because the member or the production tool is conveyed in a timely manner. Furthermore, even when the production work is interrupted, the interruption time is limited. Therefore, the operating ratio of first production equipment 91 and second production equipment 92 can be maintained high.

Further, automated guided vehicle control system 8 of the first embodiment includes setting section 35 for setting the traveling priority of each of multiple automated guided vehicles 1 based on the work priority determined from the status of the production work, and command section 36 and interference avoidance section 14 for controlling the availability for the entry of each automated guided vehicle 1 into communicating traveling path 29 based on the traveling priority set in each automated guided vehicle 1 when multiple automated guided vehicles 1 are scheduled to enter communicating traveling path 29 together. According to this, while preventing interference of multiple automated guided vehicles 1, it is possible to maintain a high operating ratio of first production equipment 91 and second production equipment 92.

Figure 6:
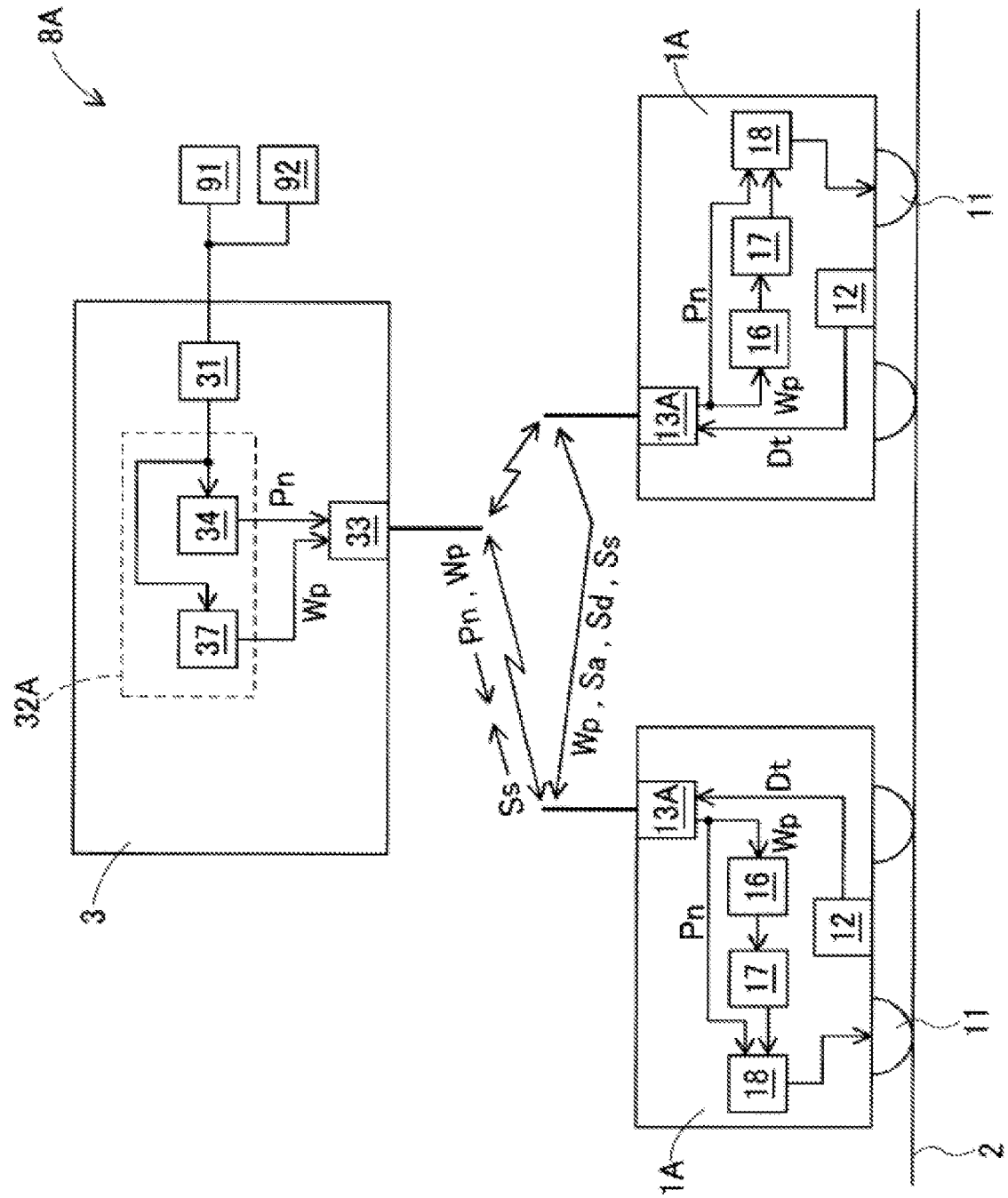
FIG. 6 is a block diagram showing a functional configuration of an automated guided vehicle control system of a second embodiment.

4. Automated Guided Vehicle 1A and Automated Guided Vehicle Control System 8A of a Second Embodiment Next, automated guided vehicle 1A and automated guided vehicle control system 8A of the second embodiment will be described with focus on the points differing from those of the first embodiment. In the second embodiment, the configuration of the periphery is the same as that of the first embodiment, and traveling path 2 is the same as that of the first embodiment. FIG. 6 is a block diagram showing a functional configuration of automated guided vehicle control system 8A of the second embodiment. In the second embodiment, a part of traveling management section 32A of production management device 3 and a part of automated guided vehicle 1A differ from those in the first embodiment.

As shown in, traveling management section 32A includes planning section 34 and acquisition section 37. The function of planning section 34 is the same as that of the first embodiment. Acquisition section 37 acquires work priority Wp determined for each automated guided vehicle 1A from the status of first production equipment 91 and second production equipment 92 which is ascertained by production management section 31. Further, acquisition section 37 sends each work priority Wp to communication section 33. Communication section 33 transmits traveling plan Pn and work priority Wp to communication section 13A of each automated guided vehicle 1A.

Further, automated guided vehicle 1A has driving section 11, marker detecting section 12, communication section 13A, storage section 16, determination section 17, and interference avoidance section 18. The functions of driving section 11 and marker detecting section 12 are the same as those of the first embodiment. Communication section 13A performs an information exchange by communicating with communication section 33 of production management device 3. Communication section 13A receives information about traveling plan Pn and work priority Wp from communication section 33. Further, communication section 13A transmits stop signal Ss to communication section 33.

Furthermore, communication section 13A has a bidirectional wireless communication function between multiple automated guided vehicles 1A. Each communication section 13A of multiple automated guided vehicles 1A exchanges the information about work priority Wp, as well as approach signal Sa, direction signal Sd, and stop signal Ss to each other. Storage section 16 stores information about the work priority Wp of automated guided vehicle 1A itself, and temporarily stores information about work priority Wp of another acquired automated guided vehicle 1A.

Determination section 17 compares the information about work priority Wp between automated guided vehicle 1A and another automated guided vehicle 1A with each other, and determines the level of its own (corresponding automated guided vehicle 1A) traveling priority. When both itself (corresponding automated guided vehicle 1A) and another automated guided vehicle 1A are scheduled to enter communicating traveling path 29, interference avoidance section 18 controls whether to execute the entry to communicating traveling path 29 based on the determination result of determination section 17. Interference avoidance section 18 controls driving section 11 according to traveling plan Pn at normal times.

Figure 7:
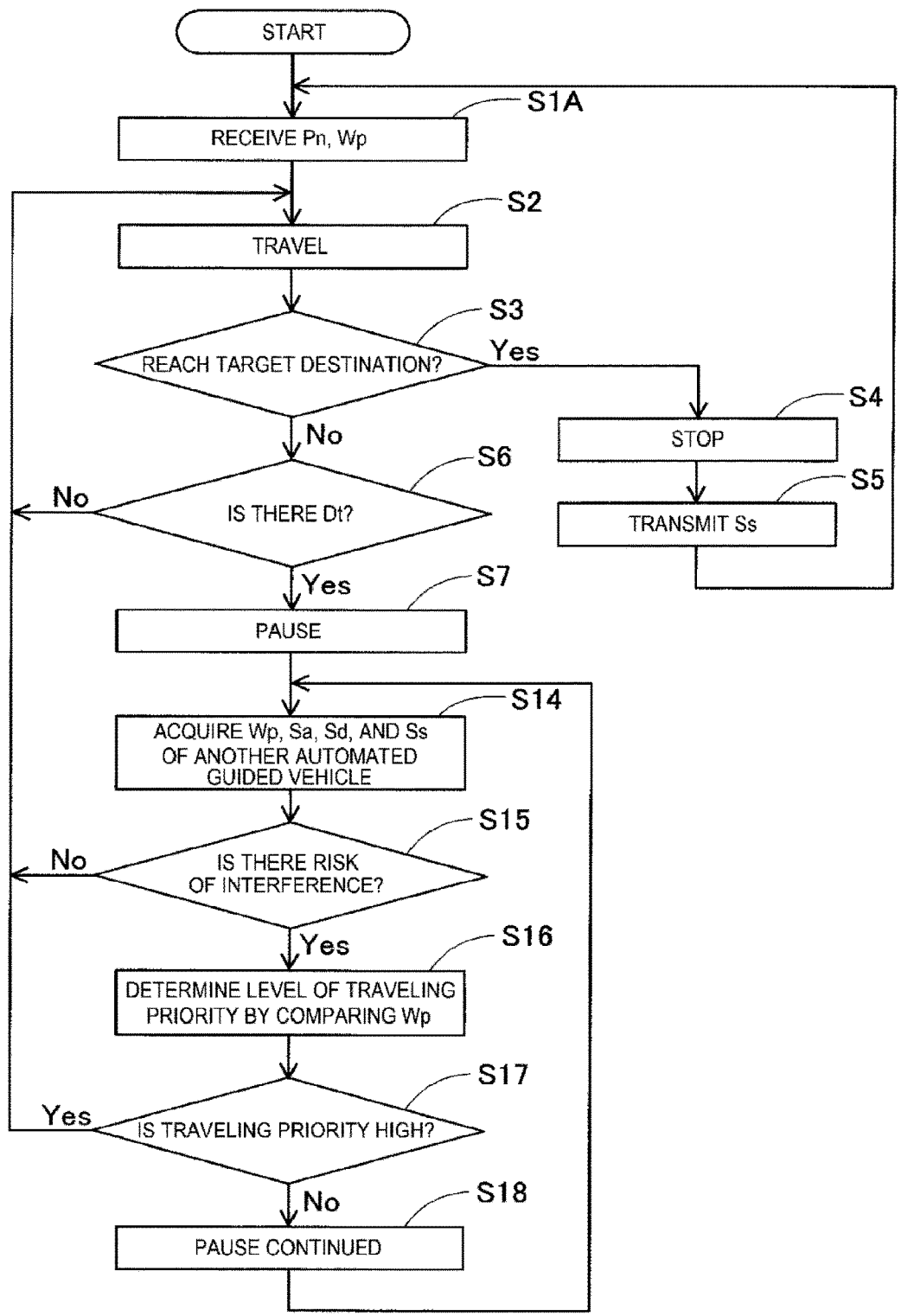
FIG. 7 is an operation flowchart illustrating an operation of the automated guided vehicle of the second embodiment.
Figure 8:
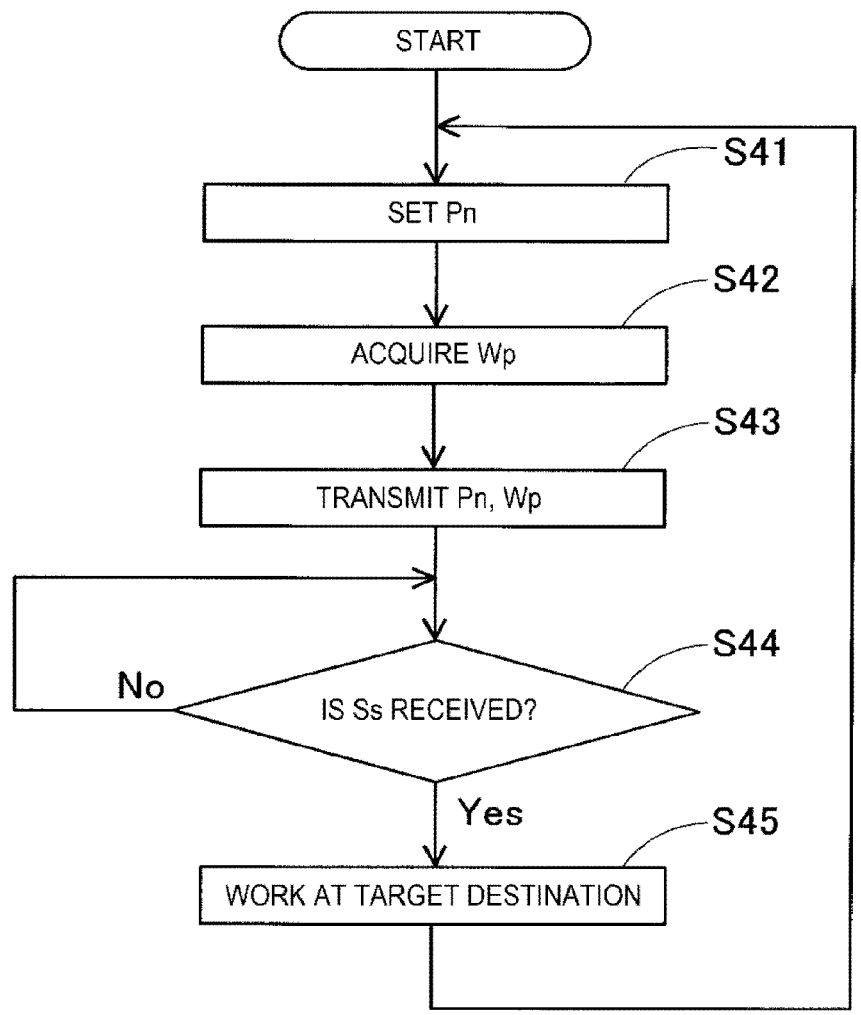
FIG. 8 is an operation flowchart illustrating an operation of a traveling management section of a production management device of the second embodiment.

Next, the operation of automated guided vehicle 1A and automated guided vehicle control system 8A of the second embodiment will be described. FIG. 7 is an operation flowchart illustrating an operation of automated guided vehicle 1A of the second embodiment. Further, FIG. 8 is an operation flowchart illustrating an operation of traveling management section 32A of production management device 3 of the second embodiment. Traveling management section 32A uses the operation flow shown in for multiple automated guided vehicles 1A in parallel.

In step S1A in, communication section 13A of automated guided vehicle 1A receives information about traveling plan Pn and work priority Wp from communication section 33. Subsequently, storage section 16 stores information about the work priority Wp of automated guided vehicle 1A itself. The subsequent steps S2 to S7 are the same as those in the first embodiment. In step S7, automated guided vehicle 1 is paused in the vicinity of marker (231, 232, 271, 272). In the next step S14, communication section 13A acquires information about work priority Wp of another automated guided vehicle 1A, approach signal Sa, direction signal Sd, and stop signal Ss by the bidirectional wireless communication with communication section 13A of another automated guided vehicle 1A.

In the next step S15, determination section 17 determines whether there is a risk of interfering with another automated guided vehicle 1A in communicating traveling path 29. The determination method is similar to step S27 in. That is, determination section 17 determines that there is no risk of interfering when the own (corresponding automated guided vehicle 1A) traveling direction is the exiting direction from communicating traveling path 29. In addition, determination section 17 determines that there is no risk of interfering when another automated guided vehicle 1A is stopped. Further, determination section 17 determines that there is no risk of interfering when another automated guided vehicle 1A is traveling in the exiting direction. On the other hand, determination section 17 determines that there is a risk of interference when another automated guided vehicle 1A is traveling in the entering direction.

When there is no risk of interference, determination section 17 returns the execution of the operation flow to S2, and the corresponding automated guided vehicle 1A continues traveling. In step S16 when there is a risk of interfering, determination section 17 compares the information about work priority Wp between the corresponding automated guided vehicle 1A and another automated guided vehicle 1A with each other, and determines the level of its own (corresponding automated guided vehicle 1A) traveling priority. In the next step S17, when the work priority of the corresponding automated guided vehicle 1A is higher, interference avoidance section 18 returns the execution of the operation flow to S2, and the corresponding automated guided vehicle 1A continues traveling. When the work priority of the corresponding automated guided vehicle 1A is lower, interference avoidance section 18 proceeds the execution of the operation flow to S18. Note that when the work priorities of multiple automated guided vehicles 1A are equal, the rules described in the first embodiment are used.

In step S18, interference avoidance section 18 continues the pause and returns the execution of the operation flow to step S14. As a result, the corresponding automated guided vehicle 1A repeats the operation loops from step S14 to step S18. In step S14 after another automated guided vehicle 1A leaves communicating traveling path 29, approach signal Sa and direction signal Sd which indicates exiting direction are transmitted from another automated guided vehicle 1A. Therefore, there is no risk of interferences in step S15, and the corresponding automated guided vehicle 1A leaves the operation loops.

In step S2 after leaving the operation loop, the corresponding automated guided vehicle 1A restarts traveling and can enter communicating traveling path 29. In this way, determination section 17 and interference avoidance section 18 control whether to execute the entry into communicating traveling path 29 based on a comparison of work priority Wp with another automated guided vehicle 1A, and thus interference of multiple automated guided vehicles 1A does not occur.

On the other hand, in step S41 in, planning section 34 of traveling management section 32A sets traveling plan Pn based on the progress status of the production work acquired from production management section 31. In the next step S42, acquisition section 37 acquires work priority Wp determined for each automated guided vehicle 1A. In the next step S43, communication section 33 transmits traveling plan Pn and work priority Wp to communication section 13A of each automated guided vehicle 1A. In the next step S44, communication section 33 waits for reception of stop signal Ss. When stop signal Ss is not received, step S44 is repeated.

When communication section 33 receives stop signal Ss, traveling management section 32A recognizes that automated guided vehicle 1A has reached the target destination, and proceeds the execution of the operation flow to step S45. In step S45, traveling management section 32A waits for the end of the work at the target destination. When the work is ended, the execution of the operation flow returns to step S41, and planning section 34 sets next traveling plan Pn. In the second embodiment, interference of multiple automated guided vehicles 1A is autonomously avoided by information exchange such as work priority Wp by bidirectional communication.

Automated guided vehicle 1A of the second embodiment includes storage section 16 that stores the information about work priority Wp, determination section 17 that compares the information about work priority Wp with each other by communication with another automated guided vehicle 1A to determine the level of the traveling priority of the corresponding automated guided vehicle 1A, and interference avoidance section 18 that controls whether to execute the entry into communicating traveling path 29 based on the determination result of determination section 17 when both the corresponding automated guided vehicle 1A and another automated guided vehicle 1A are scheduled to enter communicating traveling path 29. According to this, similarly to the first embodiment, automated guided vehicle 1A does not interfere with another automated guided vehicle 1A. In addition, since the conveyance corresponding to the work priority is performed, the operating ratio of first production equipment 91 and second production equipment 92 can be maintained high.

Further, automated guided vehicle control system 8A of the second embodiment, as compared with the first embodiment, a part of the function of interference avoidance of traveling management section 32 is transferred to automated guided vehicle 1A side. Nevertheless, automated guided vehicle control system 8A, as in the first embodiment, can maintain a high operating ratio of first production equipment 91 and second production equipment 92 while preventing interferes of multiple automated guided vehicles 1A.

5. Modifications and Applications of the Embodiments

Note that production equipment (91, 92) is not limited to the board work line, and the configuration of the periphery to be applied can be modified. In addition, the first and second embodiments can be applied to a more complicated configuration of a traveling path or to three or more automated guided vehicles (1, 1A). Further, the pause in step S7 in FIGS. 4 and 7 is not essential. That is, automated guided vehicle (1, 1A) may execute the operation flow while traveling in the vicinity of marker (231; 232; 271; 272) to pause only when it is necessary to stop.

Further, the function of detecting any location on traveling path 2 may be given to automated guided vehicle (1, 1A), and then marker (231, 232, 271, 272), the location marker; and marker detecting section 12 may be omitted. In this aspect as well; similarly to the first and second embodiments, it is possible to avoid interferences between multiple automated guided vehicles (1, 1A). Further, a bypass circuit may be provided in parallel with communicating traveling path 29; and automated guided vehicle (1, 1A) having a low traveling priority may travel on the bypass circuit when there is a risk of interference. Various other modifications and applications of the first and second embodiments are possible.

INDUSTRIAL APPLICABILITY

In addition to production equipment (91, 92) for producing a board; the first and second embodiments are applicable to production equipment that produces products in various industrial fields.

REFERENCE SIGNS LIST 1, 1A: automated guided vehicle; 13, 13A; communication section; 14: interference avoidance section; 16: storage section; 17: determination section; 18: interference avoidance section; 2: traveling path; 29: communicating traveling path; 3: production management device; 31: production management section; 32, 32A: traveling management section; 33: communication section; 34: planning section; 35: setting section; 36: command section; 37: acquisition section; 8, 8A: automated guided vehicle control system; 91: first production equipment; 92: second production equipment; 93: automatic warehouse; Cd: command; Wp: work priority

The invention claimed is:

1. An automated guided vehicle which travels on a traveling path by loading at least one of a member required for a production work, in which production equipment produces a product, and a production tool detachable to the production equipment, and which shares at least a portion of the traveling path with an other automated guided vehicle, the automated guided vehicle comprising:
   a drive configured to move the automated guided vehicle;
   a marker detector configured to detect location markers;
   a communicator configured to transmit and received communications; and
   a controller configured to control the drive,
   wherein a traveling priority is variably set based on a work priority determined from a status of the production work of the product, and when a traveling priority of the automated guided vehicle is higher than a traveling priority of the other automated guided vehicle, the automated guided vehicle is prioritized for traveling on the traveling path such that the controller controls the driver to move the automated guided vehicle on the path before the other automated guided vehicle,
   wherein the status of the production work of the product is determined as at least one of production work is interrupted because of a missing part, missing part notice generated during lot production, and setup work necessary for a next lot production, and
   wherein:
      a highest work priority is given to the status of the production work of the product corresponding to production work is interrupted because of the missing part,
      a lowest work priority is given to the status of the production work of the product corresponding to setup work necessary for the next lot production, and
      a middle work priority is given to the status of the production work of the product corresponding to the missing part notice generated during lot production, the middle priority being between the highest priority and the lowest priority.

2. The automated guided vehicle according to claim 1, wherein a production management device that ascertains the status of the production work determines work priorities of the multiple automated guided vehicles and sets traveling priorities of the multiple automated guided vehicles, and
   when the multiple automated guided vehicles are scheduled to enter a part of the traveling path together, the production management device issues a command, which is relating to an availability for an entry into the part of the traveling path, to the multiple automated guided vehicles, based on the set traveling priority, and
   wherein in the automated guided vehicle:
   the communicator is configured to receive the command by communicating with the production management device; and
   the controller is configured to control, based on the command, whether the entry into the part of the traveling path is executed.

3. The automated guided vehicle according to claim 1, further comprising:
- a storage section configured to store information about the work priority;
- a determinator configured to mutually compare the information about the work priorities by communicating with the other automated guided vehicle to determine a level of a traveling priority of the automated guided vehicle itself; and
- an interference avoider configured to, when the automated guided vehicle and the other automated guided vehicle are scheduled to enter the part of the traveling path together, control based on a comparison result of the determinator whether an entry into the part of the traveling path is executed.

4. The automated guided vehicle according to claim 3, wherein the information about the work priority stored by the storage section is acquired by the storage section by communicating with a production management device that ascertains the status of the production work.

5. The automated guided vehicle according to claim 1, wherein the work priority is determined based on a time to require the member or the production tool to be loaded.

6. The automated guided vehicle according to claim 1, wherein the work priority is determined based on a production order of multiple products.

7. The automated guided vehicle according to claim 1, wherein the work priority is determined based on a degree of importance of a traveling purpose of the automated guided vehicle.

8. The automated guided vehicle according to claim 1, wherein the production equipment is a board work machine and the product is a board.

9. An automated guided vehicle control system, comprising:
- multiple automated guided vehicles configured to travel on a traveling path by loading at least one of a member required for a production work in which production equipment produces a product and a production tool detachable to the production equipment as control targets; a computer configured to:
- set a traveling priority of each of the multiple automated guided vehicles based on a work priority of the product determined from a status of the production work to prevent the multiple automated guided vehicles from impeding each other on the traveling path; and
- when the multiple automated guided vehicles are scheduled to enter a part of the traveling path together, control an availability for an entry into the part of the traveling path for each of the automated guided vehicles based on the traveling priority set for each of the automated guided vehicles,
- wherein the status of the production work of the product is determined as at least one of production work is interrupted because of missing part, missing part notice generated during lot production, and setup work necessary for a next lot production, and
- wherein:
  - a highest work priority is given to the status of the production work of the product corresponding to production work is interrupted because of the missing part,
  - a lowest work priority is given to the status of the production work of the product corresponding to setup work necessary for the next lot production, and
  - a middle work priority is given to the status of the production work of the product corresponding to the missing part notice generated during lot production, the middle priority being between the highest priority and the lowest priority.

* * * * *